(12) United States Patent
Rehfuss et al.

(10) Patent No.: US 7,036,864 B2
(45) Date of Patent: May 2, 2006

(54) VEHICLE SEAT FOR A MOTOR VEHICLE

(75) Inventors: Benjamin Rehfuss, Ostfildern (DE); Siegfried Maebert, Kirchheim (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 41 days.

(21) Appl. No.: 10/780,612

(22) Filed: Feb. 19, 2004

(65) Prior Publication Data
US 2004/0160113 A1  Aug. 19, 2004

(30) Foreign Application Priority Data
Feb. 19, 2003 (DE) ................ 103 06 920

(51) Int. Cl.
*B60N 2/00* (2006.01)
(52) U.S. Cl. .................... 296/63; 297/452.52; 267/112
(58) Field of Classification Search .................. 296/63; 297/452.52, 216; 403/188, 208; 5/244, 5/246, 255, 253, 259.1; 440/96; 267/80, 267/111, 112, 144, 110
See application file for complete search history.

(56) References Cited

U.S. PATENT DOCUMENTS

| | | | |
|---|---|---|---|
| 2,404,488 A * | 7/1946 | Hait .............................. 440/96 |
| 2,437,119 A * | 3/1948 | Overby et al. ......... 297/452.52 |
| 2,788,845 A * | 4/1957 | Bond et al. .................. 267/112 |
| 3,098,646 A * | 7/1963 | Knabusch et al. .......... 267/112 |
| 3,207,499 A * | 9/1965 | Vogel .......................... 5/259.1 |
| 3,276,765 A * | 10/1966 | Slominski et al. .......... 267/111 |
| 3,388,904 A * | 6/1968 | Feingold et al. ............ 267/111 |
| 3,525,514 A | 8/1970 | Crosby et al. |
| 3,540,717 A * | 11/1970 | Knabusch et al. .......... 267/112 |
| 3,587,120 A * | 6/1971 | Greeno ....................... 267/110 |
| 3,610,607 A * | 10/1971 | Pofferi ........................ 267/110 |
| 3,671,031 A | 6/1972 | Krakauer |
| 4,037,829 A * | 7/1977 | Crosby et al. .......... 297/452.52 |
| 4,062,087 A * | 12/1977 | Lingle ......................... 5/259.1 |
| 4,070,124 A * | 1/1978 | Crosby et al. .............. 403/208 |
| 4,153,959 A | 5/1979 | Omley |
| 4,157,172 A * | 6/1979 | Crosby ........................ 267/110 |
| 4,357,005 A * | 11/1982 | Bourke ....................... 267/144 |
| 4,454,636 A * | 6/1984 | Pearson ...................... 5/259.1 |
| 4,973,032 A * | 11/1990 | Fourrey et al. ............. 267/111 |
| 5,542,775 A * | 8/1996 | Bechtoldt et al. ........... 403/188 |
| 6,520,577 B1 * | 2/2003 | Kitagawa ............... 297/216.13 |
| 6,565,157 B1 * | 5/2003 | Barile et al. ........... 297/452.52 |
| 6,616,239 B1 * | 9/2003 | Guillot .................. 297/452.52 |
| 6,663,178 B1 * | 12/2003 | Fourrey et al. ........ 297/452.52 |
| 2002/0153759 A1 | 10/2002 | Guillot |
| 2003/0052526 A1 * | 3/2003 | Crosby et al. ......... 297/452.52 |

FOREIGN PATENT DOCUMENTS

| | | |
|---|---|---|
| DE | 1654302 | 3/1971 |
| DE | 9415241 U1 | 12/1994 |
| DE | 19927886 A1 | 1/2001 |
| DE | 19849275 C2 | 2/2001 |

\* cited by examiner

*Primary Examiner*—Kiran B. Patel
(74) *Attorney, Agent, or Firm*—Crowell & Moring LLP

(57) ABSTRACT

Spring elements incorporated into a seat are held on the front side in elastic elements for insulation of the seat against vibration of the motor vehicle.

12 Claims, 2 Drawing Sheets

VEHICLE SEAT FOR A MOTOR VEHICLE

This application claims the priority of German application 103 06 920.8, filed Feb. 19, 2003, the disclosure of which is incorporated herein by reference.

BACKGROUND AND SUMMARY OF THE INVENTION

The present invention relates to a vehicle seat for a motor vehicle with a seat frame including a front seat shell, a rear seat cross member connected with the front seat shell, and spring elements arranged between the seat shell and the seat cross member.

A fastening arrangement for undulated springs of upholstered furniture is known from German Patent DE 198 49 275 C2. In this arrangement, the springs are held in suspension clips, which are connected with a frame. Furthermore, a clamp for accommodating a spring end which is provided with a layer of noise-damping material is known from German publication DE 16 54 302.

An object of the invention is to create a vehicle seat with spring elements, which guarantees an improved seating comfort in the traveling state of the motor vehicle with respect to insulation against vibration. In addition, a simple installation as well as freedom from noise must be guaranteed.

This object is accomplished in accordance with the invention by having the spring elements respectively held insulated against vibration on the seat shell with front free bar ends and interposed elastic elements, and with rear free bar ends arranged in a sheet metal strip of the seat cross member. The dependent claims reflect further advantageous features.

Advantages chiefly attained by the invention are that by embedding the free front (in relation to the direction of travel) bar ends of the spring elements of the vehicle seat, such insulation against vibration in relation to the motor vehicle or motor vehicle body is attained that fewer vibration components are introduced into the seat and an increase in seating comfort in comparison with known vehicle seats is attainable. This is basically accomplished in that the spring elements are respectively held insulated against vibration with their front (viewed in the direction of travel) free bar ends with the interposition of an elastic element in the seat shell, and the rear free bar ends are arranged in a sheet metal strip of the seat cross member.

Moreover, the elastic elements are in each case arranged in a semicircular rounded out receptacle of a sheet metal shell element, which can be slid into the cushion shell of the seat structure. The sheet metal shell element has a front (viewed in the direction of travel) opening for accommodating the free bar end of the spring element, and this bar element is set at a distance from the wall of the accommodation with a dimension "a" in a horizontal plane. Through this construction and arrangement of the sheet metal shell element, it is advantageously ensured that a simple installation into the sheet metal shell element is achieved, since the free bar end of the spring element is respectively held in a casing element embedded into the elastic element and this is severed for a radial accommodation of the free bar end. The free bar end of the spring element can be simply installed through the opening of the sheet metal shell element. Only a minimized surface pressure is exerted on the elastic element due to installation in the casing in order to improve the service life of the construction.

A connection of the sheet metal shell element with the seat shell takes place advantageously in that receptacles spaced from one another and hooking strips for slots in the seat shell are provided on at least one longitudinal side of the sheet metal shell element, and further hooking strips are included on a side opposite thereto which are held in additional slots. In this way, a simplified mode of installation of the sheet metal shell element on the seat shell is attained in which the hooking strips can be suspended into the slots.

A transverse crimp is provided in the wall of the semicircular receptacle which projects into a transverse groove of the elastic element so that the elastic element is held locked in the semicircular receptacle.

The elastic element is a rubber element in which the free bar end of the spring element is held with a greater distance on the horizontal plane than on a vertical plane with a smaller distance.

Through this arrangement of the free bar end, as well as embedding by means of the casing into the elastic element, insulation against vibration, a minimization of noise, an increase in seating comfort, especially for long stretches, as well as an improvement of transfer function even in the higher frequency range from ca. 25 Hz are attained.

BRIEF DESCRIPTION OF THE DRAWINGS

An embodiment of the invention is represented in the drawings and is described in greater detail below.

DETAILED DESCRIPTION OF THE INVENTION

Figure 1:
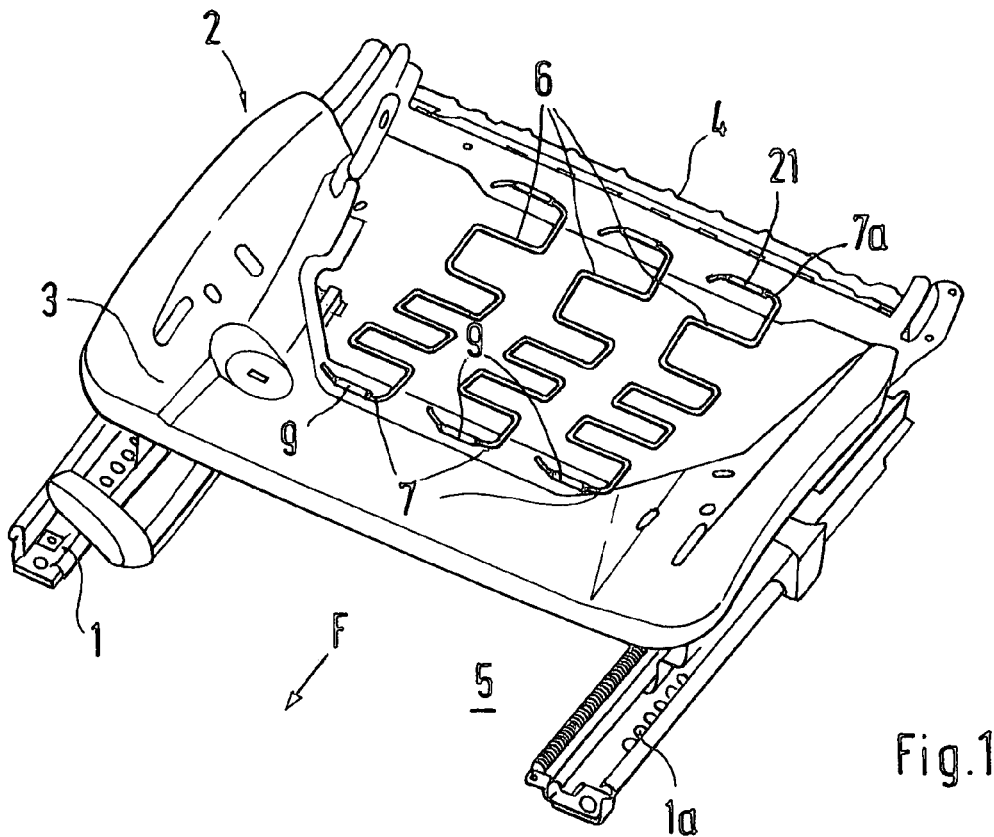
FIG. 1 provides a graphic representation of a seat underframe having a front seat shell, a rear seat cross member and spring elements arranged in between, FIG. 2 provides an oblique view of a sheet metal shell element with interposition of spring elements held in elastic elements.
Figure 2:
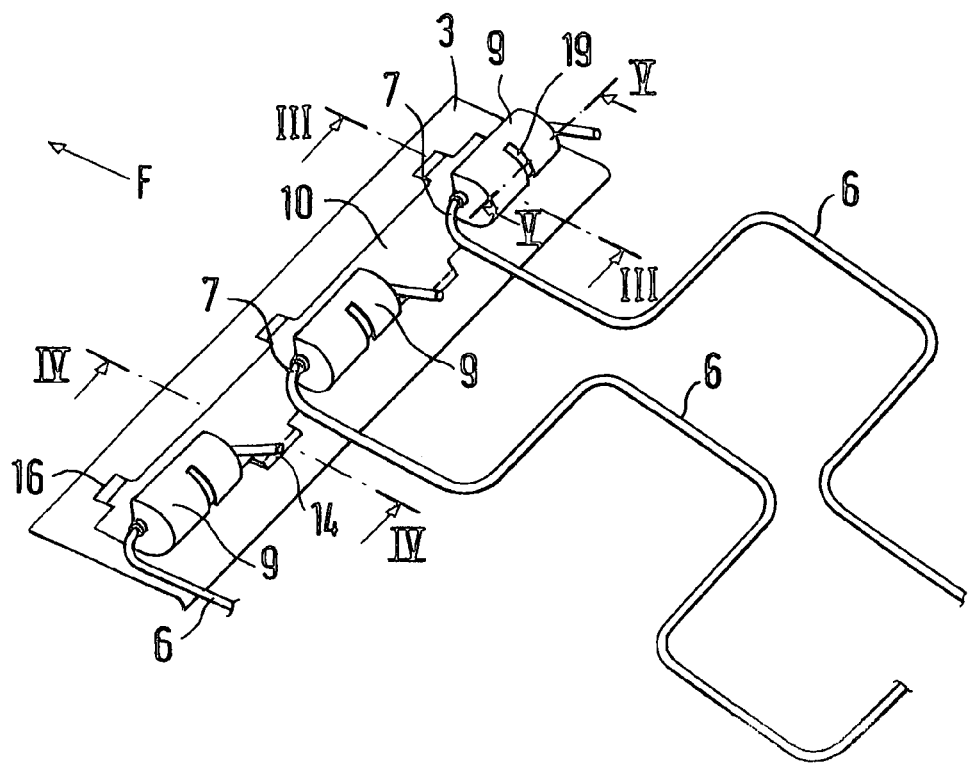
Figure 3:
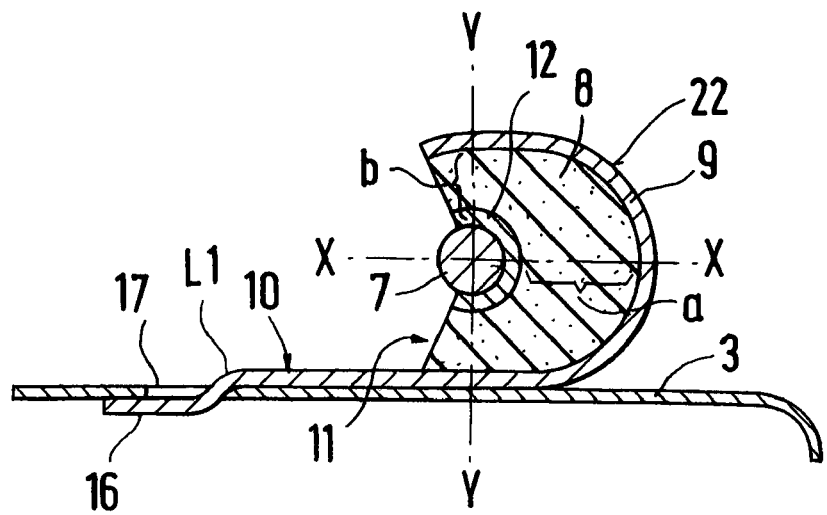
FIG. 3 is a section view along line III—III of FIG. 2.
Figure 4:
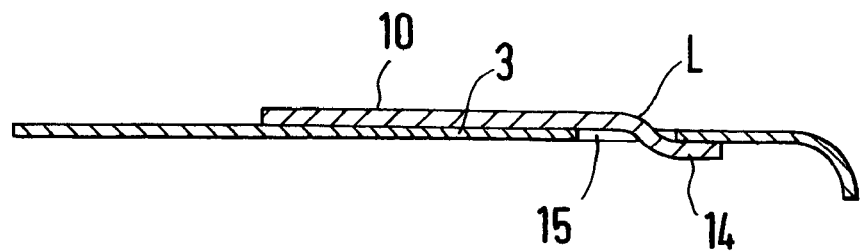
FIG. 4 is a section view along line IV—IV of FIG. 2.
Figure 5:
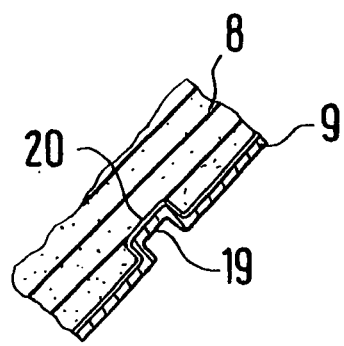
FIG. 5 is a section view along line V—V of FIG. 2 taken through the receptacle with an elastic element arranged inside.

A vehicle seat has a seat underframe 2 guided on rails 1, 1a which basically consists of a front seat shell 3 and a seat cross member 4 connected therewith. Spring elements 6, for example meandering springs, are arranged between the seat shell 3 and the seat cross member 4. The seat rails 1, 1a are connected with a floor 5 of a body structure of the motor vehicle.

The spring elements 6 extend in the longitudinal direction of the seat or of the motor vehicle and are held with their front (viewed in the direction of travel F) free bar ends 7 with interposition of an elastic element 8, for example a rubber element, on the seat shell 3 in a semicircular receptacle 9 of a sheet metal shell element 10. The receptacle 9 includes a wall 22. The additional rear (viewed in direction of travel F) free bar ends 7a of the spring elements 6 are held in sheet metal strips 21 of the seat cross member 4.

This sheet metal shell element 10 has a front (viewed in the direction of travel F) opening 11 up to which the elastic element 8 extends in which the bar end 7 of the spring element 6 is mounted partially overhung in a casing element 12. The casing element 12 is severed longitudinally for this to the extent that the bar end 7 is partially embraced and held by the casing element 12.

The receptacles 9 spaced from one another are arranged on at least one longitudinal side L of the sheet metal shell element 10 for the free bar ends 7 of the spring element 6.

Hooking strips 14 are provided between these receptacles 9 on the sheet metal shell element 10 which can be inserted into corresponding slots 15 of the seat shell 3. Further hooking strips 16 are provided on the opposite longitudinal side L1, which can likewise be inserted into corresponding slots 17 of the seat shell 3. These slip-in hooking strips 16 are provided opposite the receptacles 9.

The semicircular receptacle 9 has a transverse crimp 19 so that a fixed seating of the elastic element 8 in the semicircular receptacle 9 is guaranteed. The transverse crimp 19 extends over a partial periphery of the receptacle 9 and projects into a groove 20 of the elastic element 8 and holds this in position in the receptacle 9.

The thickness of the elastic element 8 on a horizontal plane X—X has a dimension "a" which is greater than dimension "b" on a vertical plane Y—Y so that an optimal insulation against vibration of the seat springs can be achieved. (A rubber element, for example with a hardness of 70 Shore, is used in this construction of the insulation). Other materials are also conceivable.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A vehicle seat for a motor vehicle with a seat frame comprising:
   a front seat shell,
   a rear seat cross member connected with the front seat shell, and
   spring elements arranged between the seat shell and the seat cross member,
   wherein the spring elements are respectively held insulated against vibration on the seat shell with front free bar ends with interposition of elastic elements,
   wherein rear free bar ends are arranged in a sheet metal strip of the seat cross member,
   wherein each of the elastic elements is arranged in a semicircular rounded out receptacle of a sheet metal shell element, which can be connected with the seat shell,
   wherein each sheet metal shell element has a front opening for accommodation of one of the free bar ends of the spring elements,
   wherein each free bar end is arranged spaced from a wall of the receptacle by a dimension on a horizontal plane, and
   wherein a transverse crimp is provided on the wall of the receptacle which projects into a transverse groove of a corresponding one of the elastic elements.

2. The vehicle seat according to claim 1, wherein at least one of the elastic elements is a rubber element in which one of the free bar ends of the spring elements is held with a larger dimension on a horizontal plane and a smaller dimension on a vertical plane.

3. A vehicle seat for a motor vehicle with a seat frame comprising:
   a front seat shell,
   a rear seat cross member connected with the front seat shell, and
   spring elements arranged between the seat shell and the seat cross member,
   wherein the spring elements are respectively held insulated against vibration on the seat shell with front free bar ends with interposition of elastic elements,
   wherein rear free bar ends are arranged in a sheet metal strip of the seat cross member,
   wherein each of the elastic elements is arranged in a semicircular rounded out receptacle of a sheet metal shell element, which can be connected with the seat shell,
   wherein each sheet metal shell element has a front opening for accommodation of one of the free bar ends of the spring elements,
   wherein each free bar end is arranged spaced from a wall of the receptacle by a dimension on a horizontal plane,
   wherein the receptacle is one of a plurality of receptacles spaced from one another,
   wherein hooking strips arranged for reception in slots in the seat shell are provided on at least one longitudinal side of the sheet metal shell element, and
   wherein further hooking strips are provided on an opposite longitudinal side of the sheet metal shell element so as to be held in additional slots.

4. A vehicle seat for a motor vehicle with a seat frame comprising:
   a front seat shell,
   a rear seat cross member connected with the front seat shell, and spring elements arranged between the seat shell and the seat cross member,
   wherein the spring elements are respectively held insulated against vibration on the seat shell with front free bar ends with interposition of elastic elements,
   wherein rear free bar ends are arranged in a sheet metal strip of the seat cross member,
   wherein each of the elastic elements is arranged in a semicircular rounded out receptacle of a sheet metal shell element, which can be connected with the seat shell,
   wherein each sheet metal shell element has a front opening for accommodation of one of the free bar ends of the spring elements,
   wherein each free bar end is arranged spaced from a wall of the receptacle by a dimension on a horizontal plane, and
   wherein at least one of the elastic elements is a rubber element in which one of the free bar ends of the spring elements is held with a larger dimension on a horizontal plane and a smaller dimension on a vertical plane.

5. A vehicle seat for a motor vehicle with a seat frame comprising:
   a front seat shell,
   a rear seat cross member connected with the front seat shell, and
   spring elements arranged between the seat shell and the seat cross member,
   wherein the spring elements are respectively held insulated against vibration on the seat shell with front free bar ends with interposition of elastic elements,
   wherein rear free bar ends are arranged in a sheet metal strip of the seat cross member,
   wherein each of the elastic elements is arranged in a semicircular rounded out receptacle of a sheet metal shell element, which can be connected with the seat shell,
   wherein the receptacle is one of a plurality of receptacles spaced from one another, wherein hooking strips arranged for reception in slots in the seat shell are provided on at least one longitudinal side of the sheet metal shell element, and wherein further hooking strips are provided on an opposite longitudinal side of the sheet metal shell element so as to be held in additional slots.

6. The vehicle seat according to claim 5, wherein at least one of the elastic elements is a rubber element in which one of the free bar ends of the spring elements is held with a larger dimension on a horizontal plane and a smaller dimension on a vertical plane.

7. A vehicle seat for a motor vehicle with a seat frame comprising:

a front seat shell, a rear seat cross member connected with the front seat shell, and spring elements arranged between the seat shell and the seat cross member, wherein the spring elements are respectively held insulated against vibration on the seat shell with front free bar ends with interposition of elastic elements, wherein rear free bar ends are arranged in a sheet metal strip of the seat cross member, wherein each of the elastic elements is arranged in a semicircular rounded out receptacle of a sheet metal shell element, which can be connected with the seat shell, and wherein at least one of the elastic elements is a rubber element in which one of the free bar ends of the spring elements is held with a larger dimension on a horizontal plane and a smaller dimension on a vertical plane.

8. A vehicle seat for a motor vehicle with a seat frame comprising:

a front seat shell, a rear seat cross member connected with the front seat shell, and spring elements arranged between the seat shell and the seat cross member, wherein the spring elements are respectively held insulated against vibration on the seat shell with front free bar ends with interposition of elastic elements, wherein rear free bar ends are arranged in a sheet metal strip of the seat cross member, wherein the free bar ends of the spring elements are held in a casing elements embedded into the elastic elements, wherein the casing elements are severed for radial accommodation of the free bar ends, and wherein at least one of the elastic elements is a rubber element in which one of the free bar ends of the spring elements is held with a larger dimension on a horizontal plane and a smaller dimension on a vertical plane (Y—Y).

9. A vehicle seat for a motor vehicle with a seat frame comprising:

a front seat shell, a rear seat cross member connected with the front seat shell, and spring elements arranged between the seat shell and the seat cross member, wherein the spring elements are respectively held insulated against vibration on the seat shell with front free bar ends with interposition of elastic elements, wherein rear free bar ends are arranged in a sheet metal strip of the seat cross member, and wherein at least one of the elastic elements is a rubber element in which one of the free bar ends of the spring elements is held with a larger dimension on a horizontal plane and a smaller dimension on a vertical plane.

10. A motor vehicle including a vehicle seat with a seat frame comprising:

a front seat shell, a rear seat cross member connected with the front seat shell, and spring elements arranged between the seat shell and the seat cross member, wherein the spring elements are respectively held insulated against vibration on the seat shell with front free bar ends with interposition of elastic elements, wherein rear free bar ends are arranged in a sheet metal strip of the seat cross member, wherein each of the elastic elements is arranged in a semicircular rounded out receptacle of a sheet metal shell element, which can be connected with the seat shell, wherein each sheet metal shell element has a front opening for accommodation of one of the free bar ends of the spring elements, wherein each free bar end is arranged spaced from a wall of the receptacle by a dimension on a horizontal plane, and wherein a transverse crimp is provided on the wall of the receptacle which projects into a transverse groove of a corresponding one of the elastic elements.

11. A motor vehicle including a vehicle seat with a seat frame comprising:

a front seat shell, a rear seat cross member connected with the front seat shell, and spring elements arranged between the seat shell and the seat cross member, wherein the spring elements are respectively held insulated against vibration on the seat shell with front free bar ends with interposition of elastic elements, wherein rear free bar ends are arranged in a sheet metal strip of the seat cross member, wherein each of the elastic elements is arranged in a semicircular rounded out receptacle of a sheet metal shell element, which can be connected with the seat shell, wherein the receptacle is one of a plurality of receptacles spaced from one another, wherein hooking strips arranged for reception in slots in the seat shell are provided on at least one longitudinal side of the sheet metal shell element, and wherein further hooking strips are provided on an opposite longitudinal side of the sheet metal shell element so as to be held in additional slots.

12. A motor vehicle including a vehicle seat with a seat frame comprising:

a front seat shell, a rear seat cross member connected with the front seat shell, and spring elements arranged between the seat shell and the seat cross member, wherein the spring elements are respectively held insulated against vibration on the seat shell with front free bar ends with interposition of elastic elements, wherein rear free bar ends are arranged in a sheet metal strip of the seat cross member, and wherein at least one of the elastic elements is a rubber element in which one of the free bar ends of the spring elements is held with a larger dimension on a horizontal plane and a smaller dimension on a vertical plane.

* * * * *